United States Patent Office

3,081,172
Patented Mar. 12, 1963

3,081,172
PRODUCTION OF BREWERS' WORT WITH ENZYMES
George E. Dennis, Dorchester, Ontario, and Richard C. Quittenton, London, Ontario, Canada, assignors to John Labatt Limited, London, Ontario, Canada
No Drawing. Filed Feb. 1, 1961, Ser. No. 86,290
Claims priority, application Canada Feb. 8, 1960
3 Claims. (Cl. 99—51)

This invention relates to the production of brewers' wort for use in the manufacture of non-distilled fermented beverages such as ales, lagers, porters, stouts and the like.

According to known methods, brewers' wort is derived from a mash of malt and adjuncts such as prepared cereals, unmalted raw cereals, or other carbohydrate source. Any unmodified starches such as raw corn grits must be precooked in a separate cooker before being added to the mash and this is generally done by mixing them with water and with finely ground malt. This mixture is heated to produce a liquefied starch which is combined with the main malt mash. The purpose of adding malt to the cooker together with the unmodified starches is to bring the starchy material into liquid form so that the starch will be completely converted to sugar in the main mash.

The use of malt for the above purpose has various undesirable features. In particular, the malt contains malt husks and malt fat which tend to give an inferior colour and taste to the worts and finished beers. Since one of the primary purposes of using adjuncts is to produce a paler beer, the addition of malt to the adjunct tends to destroy the inherent advantages of such adjunct.

Recently proposals have been made whereby unmodified brewing adjuncts may be prepared without the use of ground malt by cooking such adjunct in the presence of added enzymes. One such proposal is described in United States Patent No. 2,790,718 to Anthony L. Nugey of April 30, 1957. According to the Nugey method, the thus cooked adjunct is mixed with a main malt mash for conversion of the starchy material into sugars and dextrins. The advantage of using enzymes in place of ground malt are firstly that the economics of such a substitution are attractive, and secondly that the resulting wort is not infused with flavoured materials present in the malt grains and in husk which is normally associated with such grains, and which may be extracted during this high temperature cooking treatment.

Such prior proposals while potentially enabling improvement of solubilization of the unmodified adjuncts did not provide fully the advantages which may be expected to flow from the complete or substantially complete elimination of malt as the primary enzymatic agent in the whole mash. Furthermore, the cooking operation is not required where modified adjuncts such as unmalted barley are used. The Nugey process applies specifically and exclusively to the cooking operation.

We have now found that by following appropriate procedures malt may be partially or completely eliminated as the primary enzymatic agent in the mash. This is based on our discovery that when enzymes are added to a raw cereal mash, such as unmalted barley, the enzymatic activity of the latent enzymes in the grain is also released, as in the malting process, and that furthermore, through adequate control of the proteolytic enzymatic activity in the mash, a malt-like flavour and character can be obtained in the wort. Thus, malt is not required in the mash for either its enzymatic or flavouring properties. If desired, however, the mash may contain small amounts of malt to satisfy traditional concepts that beer should be brewed from malt. A typical mash bill, therefore, might contain up to 10% malt, for this purpose, rather than the 60 to 100% malt which now corresponds to conventional brewing practice.

Basically our invention resides in the discovery that by adding diastatic enzymes to a mash containing starch at a temperature of from about 54° C. to about 75° C., malt may be eliminated as the primary enzymatic agent. This mash may or may not contain solubilized protein. If insufficient is present soluble organic and/or inorganic nitrogen is added prior to fermentation.

More specifically, proteolytic and diastatic enzymes in an amount of from about 5 grams to 50 pounds per thousand pounds of carbohydrate source are added to a mash containing starch and protein which may or may not be by itself enzymatically active at a temperature of from 35 to 50° C., to enzymatically reduce some of the protein to its soluble form. The mash is held at this temperature for a period of from about 5 minutes to about 8 hours and then is raised to a temperature of from 54° C. to about 75° C. to convert the carbohydrate to a fermentable form, which conversion requires a period of from about 5 minutes to about 4 hours. Addition of other enzymes may be made to free the starch granules from their matrix, and in the case of certain substrates additional protein and/or solubilized protein or inoragnic nitrogen may be added to the wort prior to fermentation.

The result is a new method for producing brewers' wort whereby the diastatic and proteolytic action of the malt is completely or partially replaced by other added enzymes. Any liquefaction which is induced by these enzymes occurs in conjunction with the conversion of the starch to sugar and/or the proteolysis. Thus, our invention applies to a normal cooker operation in which the starch is gelatinized and then liquefied by means of malt enzymes and also to the process as described by Nugey. Moreover, certain starch sources, such as barley and other raw cereal grains consist of partially or completely modified starch so that it is possible to liquefy the starch during proteolysis and conversion without carrying out the cooker operation. Our new process can result in a very substantial decrease in production costs since unmalted barley or corn, or similar starchy material may be used to supply substantially all of the carbohydrate needed for fermentation instead of the more costly malted grain that is now used. This is accomplished without loss of quality in the worts and beer products and can result in beers of lighter flavour and/or higher quality.

The invention will be more fully understood by reference to the following examples illustrating the procedure followed in carrying out the process of the invention on a small scale.

*Example I*

7 grams of commercially available mixed enzyme system containing phosphorylases, diastases, proteases, etc., were added to a mash consisting of 22 lbs. of unmalted barley in water. This mash of a total volume of about 8 gallons was held at about 50° C. for three hours, the temperature was then raised to about 65° C. for one hour. The mash was heated to about 80° C. to stop enzyme action and lautered and sparged. The 13½ gallons of wort obtained were boiled for 90 minutes with about 120 grams of mixed hops, cooled, pitched with an ale yeast, and finished in a normal manner. This procedure produced an acceptable beer, both analytically and organoleptically.

*Example II*

28 grams of a commercially available mixed enzyme system containing phosphorylases, diastases, proteases, etc., were added to a mash consisting of 25 lbs. of unmalted barley in water. This mash to a total volume of about 7 gallons was held at about 46° C. for 90 minutes, the temperature was then raised to about 63° C. for one hour. The mash was heated to about 80° C. to stop enzyme action and lautered and sparged. The 13½ gallons of wort obtained were boiled for 90 minutes with about 70 grams of mixed hops, cooled, pitched with lager yeast, and finished in a normal manner. This procedure produced an acceptable beer, both analytically and organoleptically.

*Example III*

28 grams of a commercially available mixed enzyme system containing phosphorylases, diastases, proteases, etc., were added to a mash consisting of 25 lbs. of unmalted wheat in water. Processing was identical to that in Example II. This procedure produced an acceptable beer, both analytically and organoleptically.

*Example IV*

14 grams of a commercially available mixed enzyme system containing phosphorylases, diastases, proteases, etc., were added to mash consisting of 25 lbs. 10 oz. barley in water. This mash to a total volume of about 8 gals. was held at about 46° C. for 20 minutes, the temperature was then raised to about 63° C. for 30 minutes, 1 lb. 2 oz. of malt was added and the temperature maintained for 45 minutes. The remainder of the preparation was the same as that in Example II. The beer produced was acceptable both analytically and organoleptically.

While the examples given above apply to the traditional batch brewing methods, it is to be understood that the principles of invention apply equally well to the newer continuous brewing techniques. Furthermore, the term "diastatic enzymes" as used here is understood to include all those enzymes which operate in the conversion of starches to sugars, whether they be obtained from vegetable, animal or microbial sources.

What we claim as our invention is:

1. A method of producing brewers' wort which comprises adding to unmalted barley mash about 0.01 to 50 pounds of proteolytic and diastatic enzymes per 1000 pounds of barley, holding the enzyme-containing mash at a temperature of from about 35° C. to about 50° C. for a period of from about 5 minutes to about 8 hours, raising the mash temperature to about 54° C. to 75° C. and maintaining the latter temperature for a period of from about 5 minutes to about 4 hours.

2. A method of producing brewers' wort which comprises adding to unmalted barley mash about 7 pounds of proteolytic and diastatic enzymes per 1000 pounds of barley, holding the enzyme-containing mash at a temperature of about 50° C. for about 3 hours, raising the mash temperature to about 65° C. and maintaining the latter temperature for about one hour.

3. A method of producing brewers' wort which comprises adding to unmalted cereal grain mash about 0.01 to 50 pounds of proteolytic and diastatic enzymes per 1000 pounds of cereal grain, holding the enzyme-containing mash at a temperature of from about 35° C. to about 50° C. for a period of from about 5 minutes to about 8 hours, raising the mash temperature to about 54° C. to 75° C. and maintaining the latter temperature for a period of from about 5 minutes to about 4 hours.

References Cited in the file of this patent

UNITED STATES PATENTS 2,970,054     Nugey et al. _____ Jan. 31, 1961